United States Patent [19]

O'Connor et al.

[11] Patent Number: 4,635,217

[45] Date of Patent: Jan. 6, 1987

[54] NOISE THRESHOLD ESTIMATOR FOR MULTICHANNEL SIGNAL PROCESSING

[75] Inventors: Michael O'Connor, Cupertino; Randall L. Jackson, Fremont; David P. Marple, Palo Alto, all of Calif.

[73] Assignee: GTE Government Systems Corporation, Stamford, Conn.

[21] Appl. No.: 659,055

[22] Filed: Oct. 9, 1984

[51] Int. Cl.⁴ .................. G06F 15/20; G06G 7/19
[52] U.S. Cl. .................... 364/574; 328/163; 364/570; 364/572; 455/303
[58] Field of Search ............ 364/514, 570, 574, 571, 364/572, 724, 819, 822; 367/38, 63, 120, 124, 125; 455/296, 303; 307/491, 494, 520, 542; 328/162, 163, 165, 167

[56] References Cited

U.S. PATENT DOCUMENTS

| | | | |
|---|---|---|---|
| 3,731,072 | 5/1973 | Johnston | 364/570 X |
| 3,818,205 | 6/1974 | Wehrmann | 364/570 |
| 4,283,767 | 8/1981 | Rountree | 364/574 |
| 4,520,280 | 5/1985 | Yoshikawa et al. | 328/162 X |
| 4,538,236 | 8/1985 | Dischert et al. | 364/574 |

Primary Examiner—Parshotam S. Lall
Assistant Examiner—H. R. Herndon
Attorney, Agent, or Firm—Douglas M. Gilbert

[57] ABSTRACT

A noise threshold estimator for use in a high signal density environment defines a noise threshold level for a plurality of frequency divided channels such that X number of said channels will be defined as being active channels and the remaining channels as being inactive. Using a novel closed loop feedback technique to define a noise threshold level, the noise threshold estimator first compares the signal level of each incoming channel with an analog threshold voltage. A logic device counts the number of active channels and then scales that number according to a predetermined scaling function. The scaled binary number is added with the noise threshold level from the previous clocked interval to define a new noise threshold level. This binary noise threshold level is converted into an analog voltage and fedback to the feedback input of the noise comparison devices to be compared with the signal level of each incoming channel.

6 Claims, 2 Drawing Figures

NOISE THRESHOLD ESTIMATOR FOR MULTICHANNEL SIGNAL PROCESSING

RELATED APPLICATIONS

This invention relates to co-pending patent application Ser. No. 659,056, filed Oct. 4, 1984, entitled "A NOISE THRESHOLD ESTIMATING METHOD FOR MULTICHANNEL SIGNAL PROCESSING."

FIELD OF THE INVENTION

The present invention relates in general to electronic signal processing and in particular to a noise threshold detection technique for selecting active channels from a plurality of active and inactive channels.

BACKGROUND OF THE INVENTION

The present invention is intended for use primarily with radio receivers operating in a high-signal-density environment. A Bragg Cell receiver is one type of receiver providing a wideband input and a signal handling capability sufficient to process a multitude of different signal types including radar and communication signals.

The parallel processing of a large number of such channelized signals on a real-time basis often exceeds the capabilities of conventional receivers. In general post detection processing electronics has not kept pace with developments in optical receivers. However, there are some things that can be done to reduce the demands on the signal processor. By limiting the final stages of receiver preprocessing to those channels containing signal information, processing speed and throughput are significantly improved. Such techniques significantly reduce the data rate output of a channelized receiver since the inactive channels can be removed prior to processing. In order to select the active channels from the total number, a noise threshold has to be defined either directly or indirectly and, in such a way to maintain a high probability of capturing the information in the active channels. In order to determine a noise threshold level (which is also called a constant false alarm rate level or simply a CFAR level), there are several common techniques. One method involves performing an FFT (fast Fourier Transform) on the guard-bands of a signal. In the frequency domain, these guard-bands lie on either side of the peak signal, and from these the noise level can be extracted. Another way is the rank select threshold method. Finally, should noise display a spectrum resembling a Gaussian distribution (as it often does), statistical techniques for determining noise can be employed.

There are trade-offs to be made in each of these techniques. For a system with a large number of channels, the guardband and rank select threshold methods prove to be complicated to implement since each frequency path requires its own rather complicated circuitry. Statistical methods present problems in real-time applications since the algorithms they utilize are complicated and time consuming.

In view of the foregoing, a principle object of the present invention is the provision of a data reduction processor that uses the total signal level in all incoming channels to determine the number of channels above and below a noise threshold level.

A further object of this invention is the provision of an adaptive noise threshold estimator that allows for continuously changing noise threshold levels to follow changing signal and noise levels in the incoming channels.

Still another object is the provision of a very stable and accurate method of estimating the wideband noise level which changes as the noise in the environment changes.

SUMMARY OF THE INVENTION

These and other objects and advantages are achieved with the present signal processing apparatus. Briefly, there is provided a signal processing technique for determining a noise threshold level for a plurality of N frequency divided analog channels such that X analog channels are above the noise threshold level and N-X analog channels are below the noise threshold level. The signal processor receives a plurality of N signal input channels from a receiver that channelizes a wideband spectrum and detects the signals in each channel. The N signal inputs are applied to N threshold comparators each of which compares the signal level at each input with a feedback signal, the feedback signal being the computed noise threshold signal. The threshold comparators provide at each of the N outputs at predetermined intervals of time a first state binary signal (a 1) if the signal level at the corresponding signal input is above the level of the noise threshold signal, and a second state binary signal (a 0) if the signal level at the corresponding signal input is below the level of the noise threshold signal. These binary signals are applied to a logic device that adds the number of input signals at said first state during the selected time intervals and also scales the added number by a predetermined scaling function to produce a second binary signal. This second binary signal is applied to an adder that provides, during each selected interval, a third binary signal equal to the digital sum of the second binary signal and the third binary signal from the previously selected interval. Then a digital-to-analog converter converts the third binary signal into an analog noise threshold signal which is applied to the feedback input of the threshold comparators.

BRIEF DESCRIPTION OF THE DRAWINGS

The above and other objects, features and advantages of the present invention will become apparent from the following description of the accompanying drawings in which.

DESCRIPTION OF PREFERRED EMBODIMENT

Figure 1:
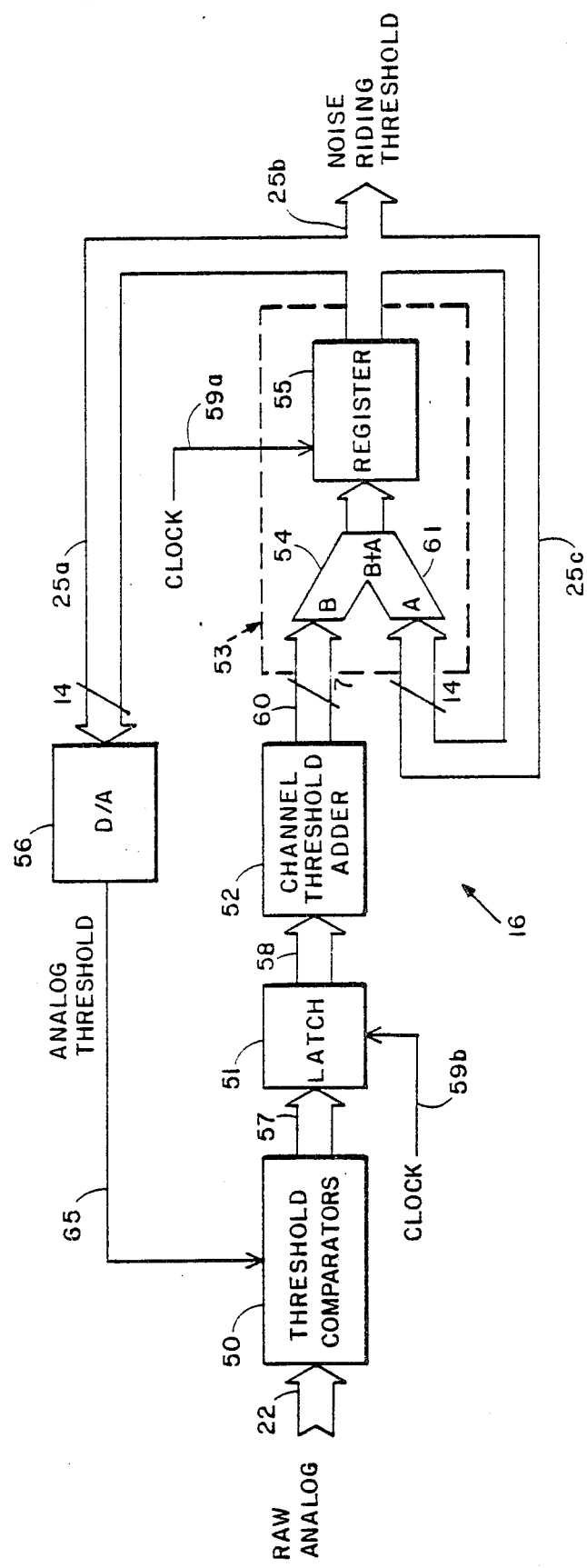
FIG. 1 is a simplified block diagram of the preferred embodiment of a noise threshold estimator.

Referring to FIG. 1, there is shown a functional block diagram having a plurality (N) of input signal lines indicated generally by a signal bus 22 and also designated "raw analog". The source of each input line is the output of a channelized radio receiver or optical processor (not shown) such as a Bragg Cell. Such receiver divide up a wideband RF spectrum (e.g. 1–2 GHz) into individual frequency separated channels (e.g. 100 channels each 10 MHz wide). The baseband signals in each channel are demodulated and applied as a voltage representing the total (or RMS) signal power in the respective channel.

Figure 2:
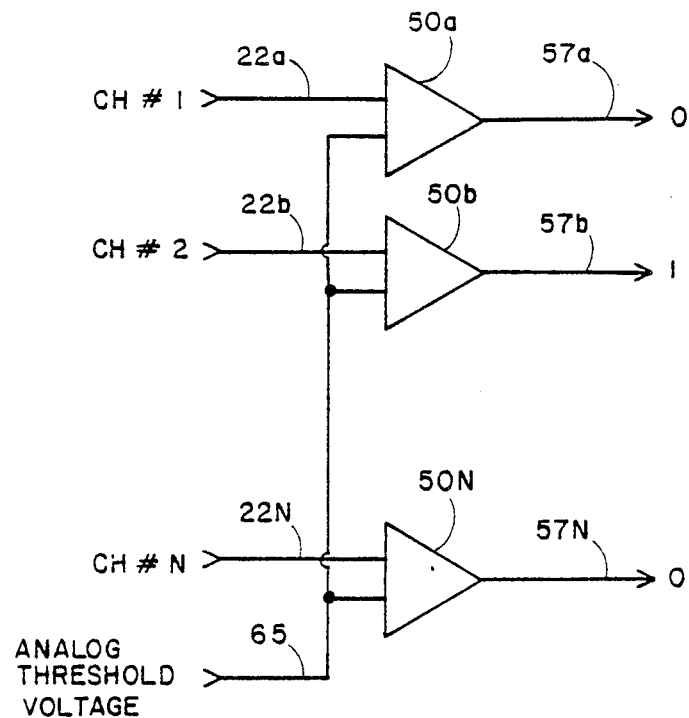
FIG. 2 is a schematic diagram showing a digital threshold comparator (50).

The raw analog bus 22 is applied to threshold comparators 50 (which are shown in more detail in FIG. 2). The function of comparators 50 is to compare the signal level of each input channel with the signal level of a reference signal applied via path 65. For each channel that carries a higher signal level than the analog threshold voltage, a binary 1 is generated on its corresponding output path 57. And, for each channel that carries a lower signal level than the analog threshold voltage, a binary 0 is generated on its corresponding output path 57. There is a one to one correspondence between the raw analog input channels 22 and the output channels 57 of the comparators 50. (The threshold comparators 50 in FIG. 1 could be implemented with the circuit shown in FIG. 2 where 50a, 50b, and 50N are op amps having a speed and bandwidth consistent with the speed of operation of the rest of the system.) All of the N output signals are clocked in parallel through data latch 51 to a channel threshold adder 52 via bus 58. Path 59b applies a clock signal from a timing circuit (not shown) to trigger latch 51 on the leading edge of the clock pulse. Adder 52 totals the number of input signals on path 58 containing a binary 1, converts that number to a scaled digital signal, and applies the result as a 7-bit byte to the B input of adder 54. The output of adder 54 on path 61 is a 14-bit byte that is latched (via register 55) to the main output path 25. This output signal, which is referred to herein as a noise riding threshold, is fedback via path 25a to digital-to-analog converter 56 and is also fedback via path 25c to the A input of adder 54. Path 59a applies a clock signal from the same timing circuit (not shown) to trigger register 55 on the trailing edge of each clock pulse. The end product of this apparatus is the noise riding threshold voltage riding on path 25b. Path 25b distributes this signal to auxiliary circuits that select out the desired channels and dump the inactive channels.

In the preferred embodiment the channel threshold adder 52 is implemented with a digital adder circuit and a PROM look up table. The total number of channels above threshold, i.e. the number having a binary 1 at the input to the adder, serves as an index into a table containing the function $f(n) = A(n - X)$, where the variable n is the actual number of channels above the noise threshold and X is the desired number of channels to be above the noise threshold. Certainly there are any number of functions (linear, nonlinear, and discontinuous) that could be used to scale the number of channels depending upon a multitude of considerations and features desired, such as the degree of control desired or the speed at which the function converges to the desired number.

The functional operation of the threshold estimator shown in FIG. 1 is as follows. The integrator 53 combines the current calculated threshold with the previous threshold level to generate a new threshold level. So when the system is first activated, the analog threshold voltage on path 65 is at zero volts and the correction factor on path 60 is at its maximum. This is shown in the example illustrated in the table below by the first row of numbers. Conversely when none of the channels is above the threshold, the correction factor is at a minimum, i.e. −300 in the example below.

The easiest way to appreciate the operation of the noise threshold estimator shown in FIG. 1 is to follow through a typical example of its operation when first powered on. The table below assumes that the total number of channels N is 100 and the desired number of active channels to be above the noise threshold X is 50. The column headings are self-explanatory.

| Register 55 Output Path 25 (binary) | Analog Threshold Voltage Path 65 (Volts) | Channels Above Threshold (n) Path 57 (#) | PROM Output f(n) Path 60 (binary) | Adder Output Path 61 (binary) |
|---|---|---|---|---|
| 0 | 0 | 100 | 300 | 300 |
| 300 | 3.0 | 80 | 180 | 480 |
| 480 | 4.8 | 60 | 60 | 540 |
| 540 | 5.4 | 45 | −30 | 510 |
| 510 | 5.1 | 48 | −12 | 498 |
| 498 | 4.98 | 51 | 6 | 504 |
| 504 | 5.04 | 50 | 0 | 504 |

When the power is first applied, path 25 and 65 are at 0 level. Consequently all 100 channels are above the 0 volt threshold and the channel threshold adder 52 generates its highest possible output on path 60 which is 300. (In the preferred embodiment this binary number is generated in a 2's complement code.) This number is added to the previous noise level on path 25c, i.e. 0, so the output of the adder 54 on path 61 is 300.

The noise level of 300 on path 61 is latched through to path 25 and is then converted to a +3.0 V on path 65 (line 2 in the table). With −3.0 V as a noise threshold the second iteration begins and only 80 channels are found to be above this level by the threshold comparators 50. The 80-channel number above is translated into a new PROM output, 180, on path 60. The binary number 180 (in 2's complement) is added with the previous threshold value of 300 on path 25c to produce a binary number of 480 on path 61. And as is shown by the example in the table above, the analog threshold voltage finally converges to a value of 5.04 V so that 50 channels are above threshold. (In certain applications it may be desireable to increase the stability of the overall detector by having the PROM set to output a 0 level when n equals X+1).

Thus this feedback apparatus functions to maintain the output digital CFAR threshold word at a value where x channels are above threshold. This provides a very stable, accurate estimate of the noise level which changes as the noise in the environment changes. The bandwidth of the FAR loop $f_L$ should be much less than the noise bandwidth $f_N$ of a single channel. This allows the loop to settle on an average value of noise rather than follow a transient noise waveform. The sample bandwidth $f_s$ should be reduced as far as possible without causing spectrum foldover and aliasing.

While a preferred embodiment of the present invention is disclosed and described above, it is contemplated that those skilled in the art may make numerous changes thereto without departing from the spirit and scope thereof. For example, it is intended that the present invention be embodied in discrete components as explained above, however, it is possible that the entire process be performed by a microprocessor or in a programmable digital computer-type apparatus. For these reasons, it is intended that the present invention not be limited to the embodiment described above, but rather be determined solely by reference to the claims hereinafter provided.

What is claimed is:

1. Signal processing apparatus for defining a noise threshold level for a plurality of N analog channels such that X analog channels are above the noise threshold level and N-X analog channels are below the noise threshold level, said apparatus comprising:

threshold comparison means having N signal inputs, a feedback input, and N outputs, said N signal inputs for receiving in parallel said N analog channels, and said feedback input for receiving a noise threshold voltage, said comparison means comparing the signal level of each N analog channels with the noise threshold voltage level and providing at each output during selected intervals of time: a first state binary signal if the signal level at the corresponding signal input is above the level of the noise threshold voltage, and a second state binary signal if the signal level at the corresponding signal input is below the level of the noise threshold voltage;

first logic means having N signal inputs and an output, said N signal inputs connected to said N outputs of said threshold comparison means, said first logic means adding the number of input signals at said first state during the selected intervals of time and scaling said added number by a predetermined scaling factor to produce a second binary signal;

second logic means having an input and an output, said input connected to said first logic means output, said second logic means providing during the selected intervals of time a third binary signal equal to the digital sum of the second binary signal and said third binary signal from the previous selected interval of time;

converter means having a converter input connected to said second logic means output and having a converter output connected to said feedback input, said converter means converting said third binary signal into a corresponding analog voltage and thereby providing to said threshold comparison means a noise threshold signal for comparison with each of said N channels during the next selected time interval.

2. Signal processing apparatus as in claim 1 wherein said converter means further comprises a digital to analog converter.

3. Signal processing apparatus as in claim 1 wherein said first logic means further comprises:

digital adder means having N inputs connected to said N outputs of said threshold comparison means, said adder means providing at an output an output digital signal equal to the sum n of the number of first state binary signals received by said adder means; and memory means for receiving said adder means output digital signal, said memory means providing a coded binary output signal corresponding to a function $f(n)$:
that is negative and goes to zero as n approaches the number X for all n in the range $0 \leq n < X$;
that is equal to 0 for $n = X$; and
that is positive and goes to zero as n approaches X for all n in the range $X < n \leq N$.

4. Signal processing apparatus as in claim 3 wherein said second logic means further comprises a digital adder circuit.

5. Signal processing apparatus as in claim 1 wherein said first logic means further comprises:

digital adder means having N inputs connected to said N outputs of said threshold comparison means, said adder means providing at an output an output digital signal equal to the sum n of the number of first state binary signals received by said adder means; and memory means for receiving said adder means output digital signal, said memory means providing a coded binary output signal corresponding to a function $f(n)$:
that is negative and goes to zero as n approaches the number X for all n in the range $0 \leq n < (X-1)$;
that is equal to 0 for all n in the range $(X-1) \leq n \leq (X+1)$; and
that is positive and goes to zero as n approaches X for all n in the range $(X+1) < n \leq N$.

6. Signal processing apparatus as in claim 1 wherein said plurality of N analog channels are frequency divided channels.

* * * * *